H. VAN CAPPELLE.
CINEMATOGRAPHIC DEVICE.
APPLICATION FILED DEC. 27, 1917.
1,370,386. Patented Mar. 1, 1921.
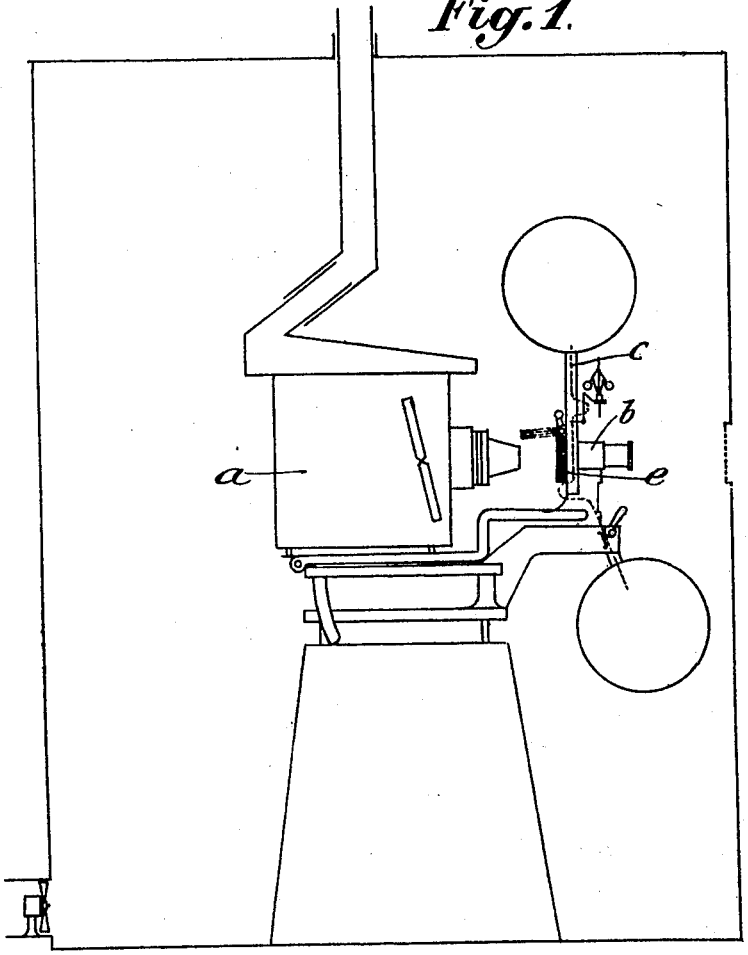
Fig. 1.
Fig. 2.
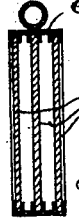
Witnesses:
F. M. Meyer
M. McCurdy
Inventor
Herman van Cappelle
Attorney

UNITED STATES PATENT OFFICE.

HERMAN van CAPPELLE, OF THE HAGUE, NETHERLANDS, ASSIGNOR OF ONE-HALF TO CHARLES van VELSEN, OF THE HAGUE, NETHERLANDS.

CINEMATOGRAPHIC DEVICE.

1,370,386.     Specification of Letters Patent.     Patented Mar. 1, 1921.

Application filed December 27, 1917. Serial No. 209,085.

*To all whom it may concern:*

Be it known that I, HERMAN VAN CAPPELLE, a subject of the Queen of the Netherlands, and resident of The Hague, Netherlands, have invented certain new and useful Improvements in Cinematographic Devices, of which the following is a specification.

My invention relates to improvements in cinematographs, and has particular reference to means whereby the traveling film may be stopped, and a portion thereof projected upon the screen while stopped, without liability of the film being burned or carbonized.

In the accompanying drawings, forming a part of this specification and in which like numerals are employed to designate like parts throughout the same, Figure 1 is a side elevation of apparatus embodying my invention, and, Fig. 2 is a detailed section through the protecting element.

In the drawings, wherein for the purpose of illustration is shown a preferred embodiment of my invention, the reference character *a* designates a cinematographic apparatus, which employs as a source of light a flaming arc produced by a pair of salted carbons, having connection with a suitable source of alternating current. The rays of light pass through the usual projecting device *b*, the film *c* passing in the path of travel of these rays. The usual shutter, which is rotated and provided with openings, is provided, and when my protector is employed the shutter is stopped so that the light will be projected through an opening in the stationary shutter.

My improved protector comprises an open frame *e*, holding a plurality of plates *f*, spaced as shown. These plates are formed of unpolished glass and are coated with paraffin oil or any other liquid which is colorless and non-volatile. The frame *e* is adapted to be arranged in the path of the projected rays and is disposed between the source of light and the film.

The picture from the stationary film is projected upon a screen coated with a layer of aluminium bronze, or upon a screen having an unburnished metallic surface.

It is thus seen that when the film is traveling the moving pictures are projected upon the screen in the usual manner, the casing *e* being moved from the path of the rays of light. When the film stops, the frame *e* is preferably automatically shifted to the active position and the shutter stopped, so that the rays of light pass through the opening in the stationary shutter and the glass plates *b*. It is thus found that the stationary picture can be projected upon the particular screen to show very clearly.

Having thus described my invention what I claim is:

In apparatus of the character described, a frame to be arranged in the path of the rays of light and disposed between the source of light and the film, and a plurality of unpolished glass plates held within the frame in spaced relation and coated with paraffin oil.

In testimony whereof I have hereunto set my hand in presence of two witnesses.

HERMAN van CAPPELLE.

Witnesses:
    CHARLES VAN VELSEN,
    W. CH. BEDET.